United States Patent
Hoynowski et al.

(10) Patent No.: US 8,166,197 B2
(45) Date of Patent: Apr. 24, 2012

(54) MULTIPATH ROUTING PROCESS

(75) Inventors: Charles Hoynowski, Redwood City, CA (US); Daniel Hirschberg, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1166 days.

(21) Appl. No.: 11/257,954

(22) Filed: Oct. 25, 2005

(65) Prior Publication Data

US 2007/0094361 A1 Apr. 26, 2007

(51) Int. Cl.
*G06F 15/173* (2006.01)
*G06F 15/16* (2006.01)
*G06F 15/177* (2006.01)

(52) U.S. Cl. ........ 709/238; 709/239; 709/240; 709/220; 709/221; 709/222; 709/223; 709/224; 709/225; 709/226; 709/227; 709/228; 709/229

(58) Field of Classification Search ................... 709/203, 709/220–229, 238–240
See application file for complete search history.

(56) References Cited

U.S. PATENT DOCUMENTS

| | | | | |
|---|---|---|---|---|
| 5,371,852 A * | 12/1994 | Attanasio et al. | ............. | 709/245 |
| 5,661,719 A * | 8/1997 | Townsend et al. | ............. | 370/216 |
| 5,862,348 A * | 1/1999 | Pedersen | ....................... | 709/229 |
| 6,006,264 A * | 12/1999 | Colby et al. | ................... | 709/226 |
| 6,256,295 B1 * | 7/2001 | Callon | ......................... | 370/254 |
| 6,330,602 B1 * | 12/2001 | Law et al. | ..................... | 709/224 |
| 6,470,389 B1 * | 10/2002 | Chung et al. | .................. | 709/227 |
| 6,487,555 B1 * | 11/2002 | Bharat et al. | .................... | 707/10 |
| 6,611,861 B1 * | 8/2003 | Schairer et al. | ............... | 709/217 |
| 6,697,333 B1 * | 2/2004 | Bawa et al. | ..................... | 370/238 |
| 6,785,704 B1 * | 8/2004 | McCanne | ....................... | 718/105 |
| 6,842,783 B1 * | 1/2005 | Boivie et al. | .................. | 709/225 |
| 6,889,259 B2 * | 5/2005 | Kapoor | .......................... | 709/245 |
| 6,934,875 B2 * | 8/2005 | Kashyap | ...................... | 714/4.11 |
| 7,020,086 B2 * | 3/2006 | Juttner et al. | .................. | 370/238 |
| 7,020,698 B2 * | 3/2006 | Andrews et al. | ............... | 709/223 |
| 7,124,187 B1 * | 10/2006 | Kodialam et al. | ............. | 709/226 |
| 7,146,432 B2 * | 12/2006 | Antes et al. | .................... | 709/239 |
| 7,286,479 B2 * | 10/2007 | Bragg | ........................... | 370/238 |
| 7,296,088 B1 * | 11/2007 | Padmanabhan et al. | ...... | 709/238 |

(Continued)

OTHER PUBLICATIONS

J. Hawkinson and T. Bates, 1996: Guidelines for creation, selection and registration of an Autonomous system (AS). Network Working Group, RFC 1930.*

*Primary Examiner* — Carl Colin
*Assistant Examiner* — Catherine Thiaw
(74) *Attorney, Agent, or Firm* — Silicon Valley Patent Group LLP; Omkar Suryadevara

(57) ABSTRACT

Methods and apparatus that enable more than one server to host a resource using a shared IP address such that a client may generally access the resource on any of the servers using the shared IP address are disclosed. According to one aspect of the present invention, a method for providing paths that allow a client to access a resource in a TCP/IP network includes obtaining an IP address, as well as associating the IP address to first and second servers. The first and second servers support the resource at the IP address, and a first path of the plurality of paths that allow the client to access the resource is between the client and the first server and a second path of the plurality of paths that allow the client to access the resource is between the client and the second server.

33 Claims, 7 Drawing Sheets

U.S. PATENT DOCUMENTS

| | | | |
|---|---|---|---|
| 7,430,611 B2 * | 9/2008 | Aiken et al. | 709/238 |
| 7,535,826 B1 * | 5/2009 | Cole et al. | 370/218 |
| 7,552,233 B2 * | 6/2009 | Raju et al. | 709/238 |
| 7,574,499 B1 * | 8/2009 | Swildens et al. | 709/223 |
| 7,650,427 B1 * | 1/2010 | Liu et al. | 709/238 |
| 7,716,367 B1 * | 5/2010 | Leighton et al. | 709/244 |
| 7,725,596 B2 * | 5/2010 | Garcia-Luna-Aceves et al. | 709/238 |
| 7,860,016 B1 * | 12/2010 | Vijendra et al. | 370/242 |
| 2002/0038360 A1 * | 3/2002 | Andrews et al. | 709/223 |
| 2002/0091760 A1 * | 7/2002 | Rozen | 709/203 |
| 2003/0005350 A1 * | 1/2003 | Koning et al. | 714/4 |
| 2003/0195984 A1 * | 10/2003 | Zisapel et al. | 709/238 |
| 2004/0078487 A1 * | 4/2004 | Cernohous et al. | 709/245 |
| 2004/0205693 A1 * | 10/2004 | Alexander et al. | 717/100 |
| 2005/0022203 A1 * | 1/2005 | Zisapel et al. | 718/105 |
| 2005/0038909 A1 * | 2/2005 | Yoshiba et al. | 709/241 |
| 2005/0071309 A1 * | 3/2005 | Ustaris | 707/1 |
| 2005/0141506 A1 * | 6/2005 | Aiken et al. | 370/392 |
| 2006/0036761 A1 * | 2/2006 | Amra et al. | 709/238 |
| 2006/0036762 A1 * | 2/2006 | Vadlakonda et al. | 709/238 |
| 2006/0112170 A1 * | 5/2006 | Sirkin | 709/217 |
| 2006/0129695 A1 * | 6/2006 | Faibish et al. | 709/245 |
| 2006/0165009 A1 * | 7/2006 | Nguyen et al. | 370/252 |
| 2006/0168334 A1 * | 7/2006 | Potti et al. | 709/239 |
| 2006/0193252 A1 * | 8/2006 | Naseh et al. | 370/225 |
| 2006/0227723 A1 * | 10/2006 | Vasseur et al. | 370/254 |
| 2007/0005784 A1 * | 1/2007 | Hares et al. | 709/230 |
| 2007/0091795 A1 * | 4/2007 | Bonaventure et al. | 370/228 |
| 2007/0091796 A1 * | 4/2007 | Filsfils et al. | 370/228 |
| 2008/0098127 A1 * | 4/2008 | Engel | 709/238 |

* cited by examiner

MULTIPATH ROUTING PROCESS

BACKGROUND OF THE INVENTION

1. Field of Invention

The present invention relates to network systems. More specifically, the invention relates to efficiently routing traffic between a client and a website associated with a web address, even when transparent fail-over is needed.

2. Description of the Related Art

As the use of the World Wide Web continues to increase, the ability to allow a client or a user to continue accessing a website even when a web server associated with the website goes off line or otherwise fails may be critical. If a user is transacting business through the website, the inaccessibility of the website for even a relatively short amount of time may be unacceptable. In the event of a failure of a web server, i.e., a web server with a first IP address associated with a website, the owner of the website may direct traffic to a different web server, i.e., a web server with a second IP address associated with the website. That is, the owner or administrator of the website may effectively change the IP address of the website.

As shown in FIG. 1A, when a user 110 attempts to access a web server associated with a website 130 using a web address 120, e.g., www.oracle.com, web address 120 is effectively mapped to a first IP address associated with website 130. As such user 110, who may generally be operating a computing system on which a browser is executing, accesses website 130, although user 110 may not be aware of the first IP address associated with website 130. As will be appreciated by those skilled in the art, the first IP address is an address for the web server associated with website 130.

When the web server associated with website 130 is inaccessible, as indicated in FIG. 1B, accessing website 130 using the first IP address associated with website 130 is typically no longer possible. That is, web address 120 no longer allows access to website 130 at the first IP address associated with website 130. Hence, the owner of website 130 may redirect traffic, as for example TCP traffic, to a web server associated website 140 at a second IP address. By way of example, when user 110 first attempts to access a website associated with web address 120 and website 130 is not accessible, user 110 generally accesses website 140. Upon access to website 140, the second IP address associated with website 140 may then be mapped to web address 120. The ability for user 110 to access website 140 when website 130 is inaccessible substantially without user 110 being aware of the inaccessibility of website 130 is typically known as a transparent fail-over.

FIG. 2 is a process flow diagram which illustrates the steps associated with a user gaining access to a website. A process 200 of gaining access to a website begins at step 204 in which a user attempts to access a website at a first address. The first address is an IP address which is associated with the website, as previously mentioned. The user may, for example, attempt to access the website by entering a web address or a domain name, e.g., www.oracle.com, into an appropriate field in a web browser executing on a computing system which is in communication with a network which is arranged to permit access to the website. A determination is made in step 206 as to whether the first IP address is working. That is, it is determined in step 206 whether the server associated with the first IP address is on-line and accessible.

If the determination in step 206 is that the first IP address is working, then the user accesses the website at the first IP address in step 208, and access to the website is effectively gained. Alternatively, if the determination in step 206 is that the first IP address is not working, then process flow proceeds to step 210 in which the user is redirected to a second IP address associated with the website. The user then accesses the website at the second IP address in step 212. It should be appreciated that in the event that the website at the second IP address is inaccessible, the user may either be directed to access the website at a third IP address, or the user may be notified that the website is not currently accessible. However, for ease of discussion, it is assumed that the user is able to access the website at the second IP address.

After the user accesses the website at the second IP address in step 212, the new IP address, i.e., the second IP address, for the website is returned to the user in step 214 and the process of gaining access to the website is completed. After the new IP address is effectively set as the IP address to use to access the website, when the user tries to access the website at a later point in time, the website may be accessed at the new IP address. It should be understood, however, that until the new IP address is effectively set as the IP address to use to access the website, when the user attempts to access the website, the user may still be attempting to access the website at the old IP address, i.e., the first IP address. Due to propagation issues, it may sometimes take a relatively long time before the new IP address is set as the IP address to use to access the website. That is, IP address change propagation issues may cause a transparent fail-over process to take longer than desired when the time delay for a new IP address to be mapped to the web address used to access a website is relatively high.

When a new IP address is not relatively efficiently mapped to a web address when the original IP address associated with the website may not be used to access the website, a user may not be able to obtain any updates to the website. As such, the user may not have access to the most up-to-date information or service, e.g., Internet service, associated with the website. A transparent fail-over process from the original IP address to the new IP address may not be considered as successfully completed until such time as the new IP address is mapped to the web address for the website.

Until a new IP address is mapped to the web address for a website, whenever access to the web address is requested, access to the website through the original IP address is first attempted. It is only when access to the website through the original IP address is not granted that access through the new IP address is attempted. Having to attempt to access a website through a plurality of IP addresses is inefficient as it may significantly increase the access time associated with accessing the website.

While the speed with which an IP address change propagation occurs may be increased to some extent, increasing the speed generally results in a relatively significant load impact, which is often impractical and, in many instances, not feasible. Further, a relatively high error rate is typical of an IP address change propagation.

Therefore, what is needed is an efficient method for providing and completing a transparent fail-over process for providing access to a website. That is, what is desired is a method and an apparatus for increasing survivability of Internet service in the event of a failure, and for decreasing website access times.

SUMMARY OF THE INVENTION

The present invention relates to a system which enables more than one server to effectively host a resource using a shared IP address such that a client may access the resource using different paths to different servers. According to one aspect of the present invention, a method for providing a plurality of paths that allow a client to access a resource such as a website in a TCP/IP network includes obtaining an IP address, as well as associating the IP address to a first server and to a second server. The first and second servers support the website at the IP address, and a first path of the plurality of paths that allow the client to access the website is between the client and the first server and a second path of the plurality of paths that allow the client to access the website is between the client and the second server.

In one embodiment, obtaining the IP address includes associating a domain name with the IP address, and the method also includes initiating a TCP session between the client and one of the servers to allow the client to access the website. In such an embodiment, initiating the TCP session may involve determining whether to use the first path to allow the client to access the website at the IP address on the first server, and using the first path to allow the client to access the website when appropriate.

The ability for a network resource such as a website to be associated with more than one server using a common IP address allows the efficiency with which the website may be accessed to be increased. When there are multiple servers which host the resource, the actual server to use in the establishment of a TCP session may be selected based on balancing the load on the servers, the physical proximity of the servers to a client or a user, the lengths of paths between the client or user and the servers, and the availability of the servers. Hence, the most efficient path may effectively be selected by a system for use in establishing the TCP session. The time needed to gain access to a website may also be decreased, since IP address change propagation may be avoided due to the fact that the website is hosted at the same IP address by different servers. Avoiding IP address change propagation substantially eliminates the load impact associated with propagating an IP address change, and allows the server on which the website is accessed to be changed substantially transparently.

According to another aspect of the present invention, a system for providing a plurality of paths that allow a client to access a website in a TCP/IP network includes means for associating the domain name for the website to a corresponding IP address, and means for associating the IP address to a first server and to a second server. The first server supports the website at the IP address and the second server supports the website at the IP address. In one embodiment, the system also includes means for initiating a TCP session between the client and one of the first server and the second server to allow the client to access the website.

In accordance with still another aspect of the present invention, an apparatus for providing a client with access to a website that is associated with a domain name includes a server arrangement and a router arrangement. The server arrangement receives a request from the client to provide an IP address associated with the website. The server arrangement is arranged to translate the domain name into the IP address. The router arrangement provides the client with access to one of a plurality of servers associated with the IP address. Each one of the servers associated hosts the website using the IP address.

In one embodiment, a first path of a plurality of paths is arranged between the client and a first server, and a second path is arranged between the client and a second server. In such an embodiment, the router arrangement is arranged to select either the first path or the second path for use in providing the client with access to the website. In another embodiment, the router arrangement includes a router and a load balancer. The load balancer cooperates with the router to select the first path for use in providing the client with access to the website when the first path is either the least loaded of the paths or the shortest of the paths.

According to yet another aspect of the present invention, a method for providing a client with access to a website includes receiving a request to access an IP address associated with a domain name of the website. The IP address is also associated with a plurality of servers arranged to host the website at the IP address. The method also includes identifying a first server of the plurality of servers for use in establishing a TCP session for the client to access the website at the IP address, and establishing the TCP session between the client and the first server.

In yet another embodiment of the present invention, a computer program product for providing a plurality of paths that allow a client to access a website in a TCP/IP network includes code devices that cause an IP address to be obtained, code devices that cause the IP address to be associated to a first server and to a second server, and a computer-readable medium that stores the computer codes. In this implementation, the first server supports the website at the IP address and the second server also supports the website at the IP address. A first path of a plurality of paths allows the client to access the website, and is between the client and the first server. A second path of the plurality of paths allows the client to access the website, and is between the client and the second server.

Other features and advantages of the invention will become readily available apparent upon review of the following description in association with the accompanying drawings, where the same or similar structures are designated with the same reference numerals.

BRIEF DESCRIPTION OF THE DRAWINGS

The invention may best be understood by reference to the following description taken in conjunction with the accompanying drawings in which.

DETAILED DESCRIPTION OF THE EMBODIMENTS

Figure 1A:
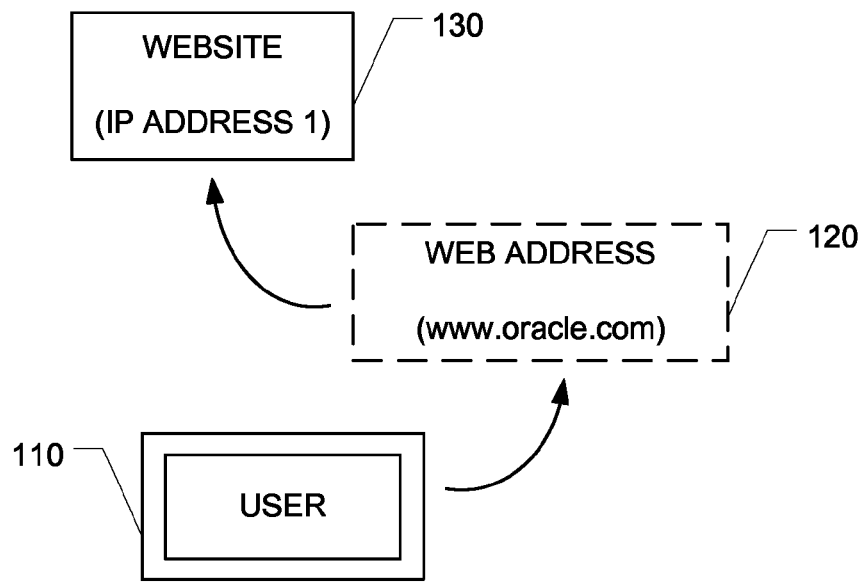
FIG. 1A is a diagrammatic representation of a user accessing a website that is accessible through the use of a web address.
Figure 1B:
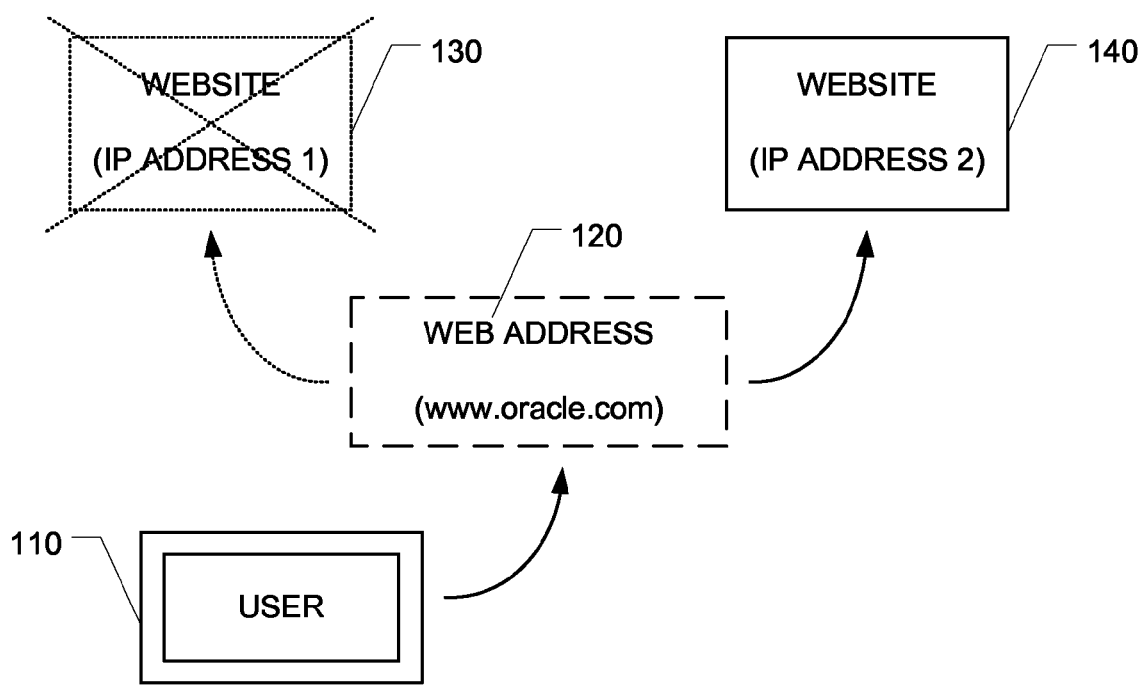
FIG. 1B is a diagrammatic representation of a user accessing a website through the use of a web address at a second IP address when a first IP address for the website is not working.
Figure 2:
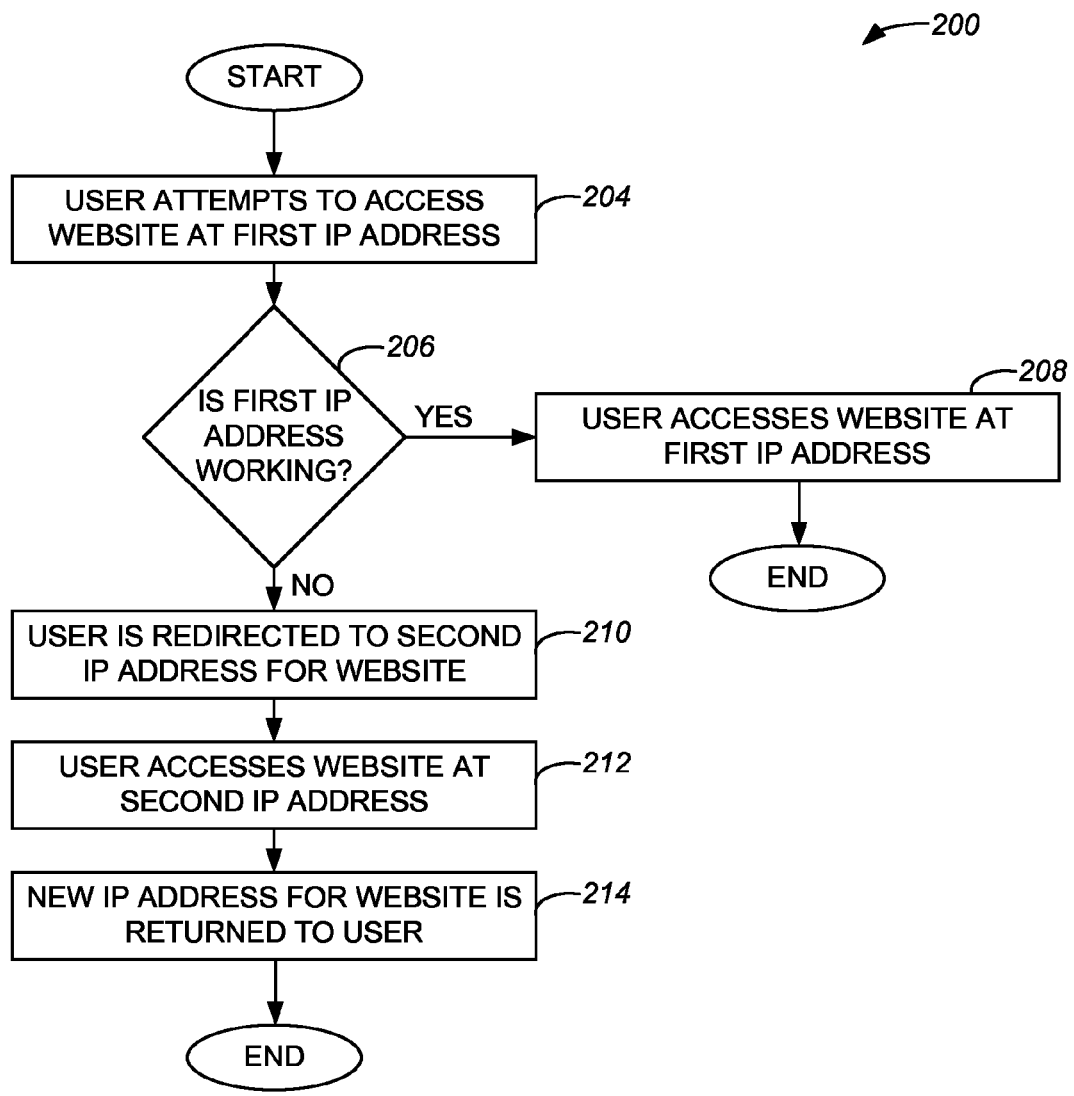
FIG. 2 is a process flow diagram which illustrates the steps associated with one conventional method of obtaining access to a website.

In the description that follows, the present invention will be described in reference to embodiments that test subsystems on a platform for a software application or a computer program product, such as a database application. However, embodiments of the invention are not limited to any particular architecture, environment, application, or implementation. For example, although embodiments will be described in reference to network database applications, the invention may be advantageously applied to any software application. Therefore, the description of the embodiments that follows is for purposes of illustration and not limitation.

When a web server associated with a first IP address that corresponds to a web address for a website becomes inaccessible, traffic, as for example Transmission Control Protocol (TCP) traffic, is redirected to a "back up" web server associated with a second different IP address that corresponds to the web address. Until the second different IP address is effectively mapped to the web address for the website, whenever access to the web address is requested, access to the website is generally attempted using the first IP address. Hence, there is often a delay before the website is accessed, as both the first IP address and the second different IP address may effectively be processed before the website is successfully accessed. Increasing the speed with which an IP address change propagation occurs may result in a relatively significant load impact, which is typically impractical.

Allowing more than one web server, as for example a web servers in different autonomous system, to be associated with the same IP address for a web address increases the efficiency with which a website may be accessed in the event that a web server goes from an available status to an unavailable status. In other words, when a plurality of web servers is arranged to allow access to the same website using the same IP address, the need to ever propagate an IP address change is effectively eliminated. Further, multiple paths may be provided for clients to access the website when the clients request access to the website or, in one embodiment, information stored on a database that is accessed through the website.

Providing multiple paths to a website, i.e., allowing multiple servers to effectively share an IP address, allows access to the website to be more efficient. By way of example, in an active/active system in which at least two of the multiple servers that share an IP address for a website are active at the same time, each client may access the website that it is closest to, or each client may access its lowest cost website. Alternatively, in an active/standby system in which one of the servers that shares an IP address for a website is active at any given time, access to the website is still more efficient because when one server becomes inaccessible, then another server may be accessed without substantially requiring that IP address change propagation occurs, thereby allowing a move from one server to another to be relatively transparent and relatively fast. That is, in an active/standby system, when an IP address for a website is shared, a transparent fail-over may occur with a high level of efficiency.

Figure 3:
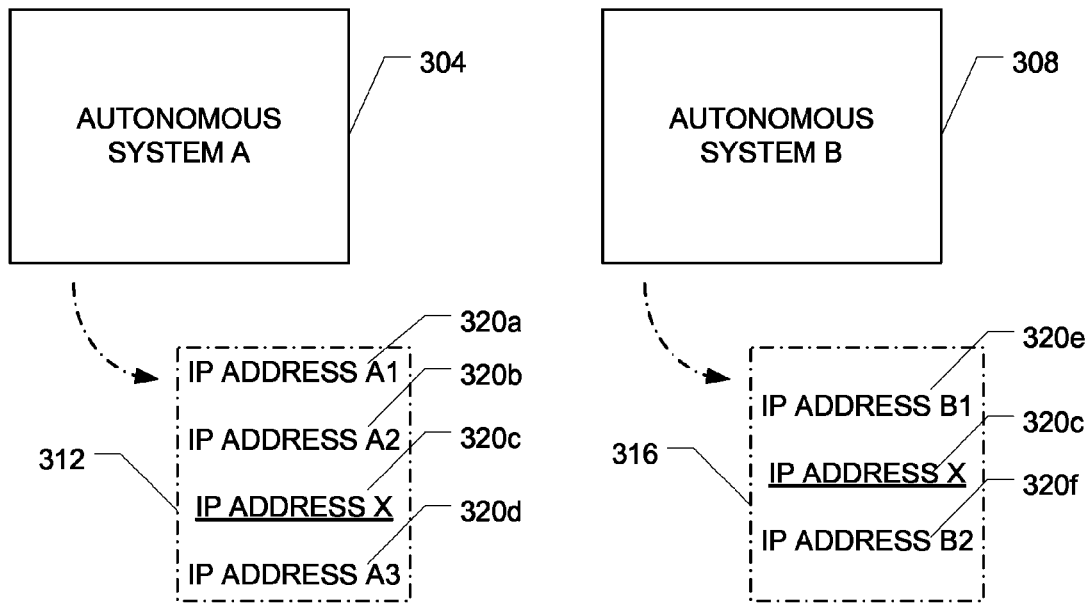
FIG. 3 is a representation of two autonomous systems which include containers that have the same IP address in accordance with an embodiment of the present invention.

The same IP address may generally be associated with different autonomous systems, as the autonomous systems are substantially separate and use an external gateway protocol to route packets between each other. That is, the same IP space may be present in two autonomous systems. A border gateway protocol effectively enables servers in different autonomous systems to share a common IP address. As shown in FIG. 3, an autonomous system "A" 304 has an associated container 312 which contains a list of IP addresses 320a-d which are used within autonomous system "1" 304. An autonomous system "B" 308, which may be in communication with autonomous system "A" 304 either directly or indirectly, has an associated container 316 which contains a list of IP addresses 320c, 320e, 320f. IP address 320c is common to both container 312 and container 316. Hence, when a user or a client (not shown) attempts to access a website associated with IP address 320c, access may be granted through either autonomous system "A" 304 or autonomous system "B" 308. More specifically, access to the website associated with IP address 320c may be achieved by either accessing a server within autonomous system "A" 304 or accessing a server within autonomous system "B" 308.

Figure 4:
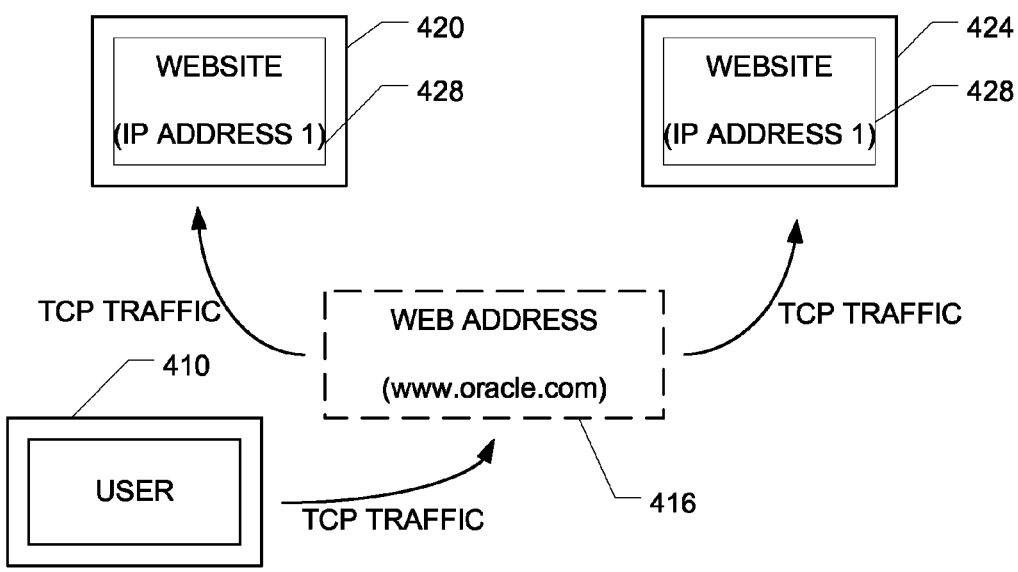
FIG. 4 is a diagrammatic representation of a user accessing either of two websites which are associated with separate web servers but have the same IP address in accordance with an embodiment of the present invention.

Referring next to FIG. 4, the availability of a website at the same IP address on more than one web server will be described in accordance with an embodiment of the present invention. When a user 410 attempts to access a website 428, e.g., when user 410 attempts to establish a TCP session with website 428 either through a first web server 420 or through a second web server 424, user 410 may enter a web address 416 into a web browser. As previously mentioned, web servers 420, 424 may be associated with different autonomous systems. Web servers 420, 424 may include any number of components including, but not limited to, memory for storing code devices associated with website 428, databases for storing information that may be accessed through website 428, and processors which enable code devices to execute. Typically, the web browser is executing on a computing system (not shown) associated with user 410.

Web address 416 is generally translated into an IP address which, in the described embodiment, is associated with website 428, and is effectively stored in containers associated with both web server 420 and web server 424. The translation of web address 416 into an associated IP address and, further, the selection of one of web servers 420, 424 for use in accessing website 428 will be discussed below with respect to FIG. 5. It should be appreciated that in some instances, as for example in an active/standby system, although both web servers 420, 424 may be associated with website 428 using the same IP address, only one of web servers 420, 424 may be active at any given time.

Figure 5:
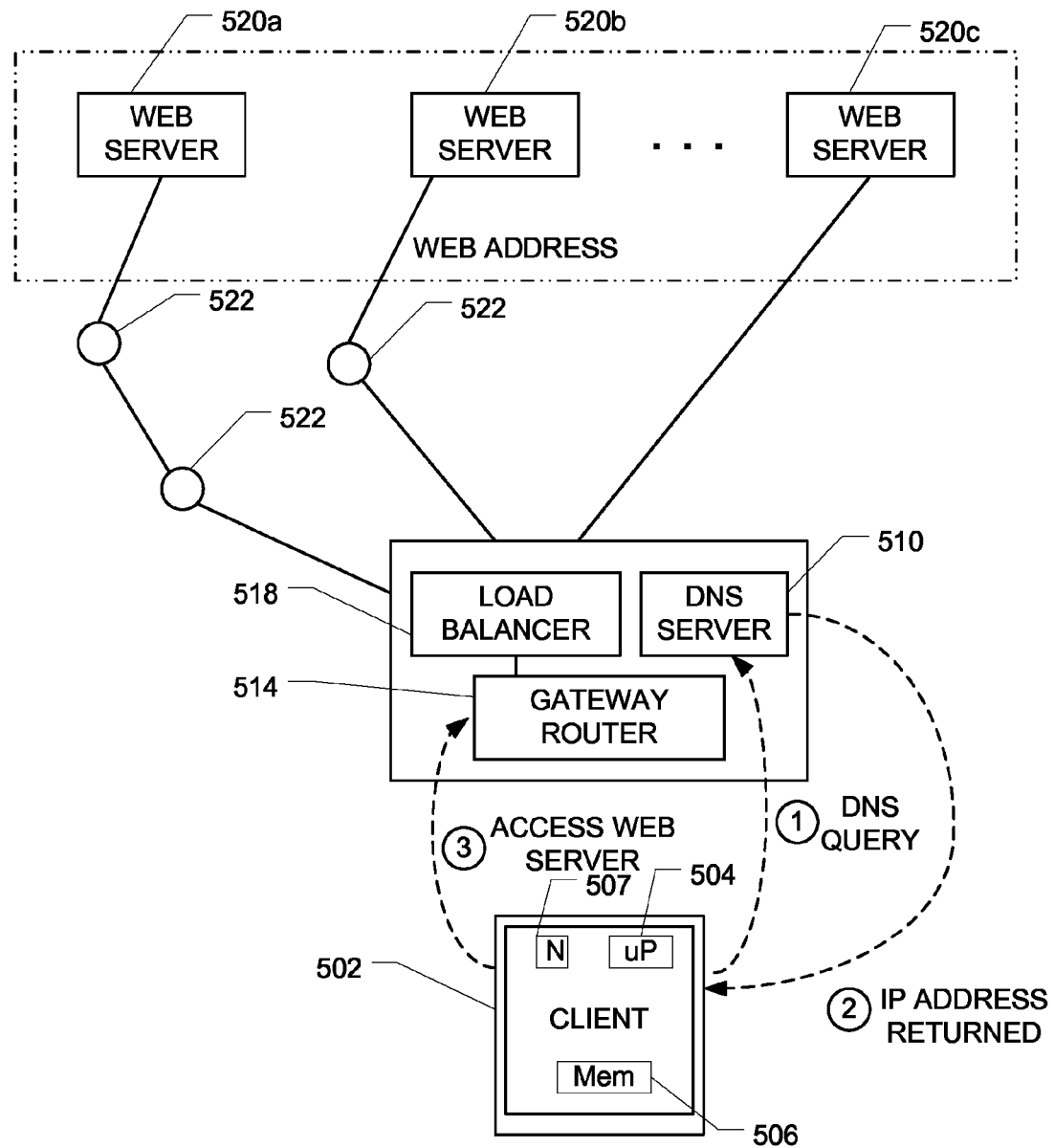
FIG. 5 is a diagrammatic representation of a process of accessing a web server during a TCP session in accordance with an embodiment of the present invention.

FIG. 5 is a diagrammatic representation of a process of accessing a web server during a TCP session in accordance with an embodiment of the present invention. As will be appreciated by those skilled in the art, during TCP sessions, requests to access a web server are generally hypertext transfer protocol (HTTP) requests. HTTP defines how messages are formatted and transmitted, and what actions web servers and browsers may take in response to various commands, as for example commands substantially originating from a client. When a Uniform Resource Locator (URL) is entered into a browser of a client, an HTTP command is eventually sent to a web server to direct the web server to fetch and to transmit a requested web page.

A client 502, which is often a computing system that includes a processor 504 and a memory 506, is arranged to query a Domain Name Server (DNS) server 510. As will be appreciated by those skilled in the art, client 502 also generally includes a network connection 507 which enables client 502 to access a plurality of web servers 520a-c, as for example via a network connection. Other components of client 502 may include, but are not limited to, a database, random access memory, read only memory, input devices, display devices, and various non-transitory computer readable media which are capable of storing code devices. Various non-transitory computer readable media may include such media as digital versatile discs (DVDs), CDROMS, diskettes, tapes, and flash memory devices.

When client 502 attempts to access a website, client 502 may access the website through any web server 520a-c that is associated with the website. It should be appreciated that client 502 and web servers 520a-c may generally be in communication over an overall TCP/IP network. Client 502 may gain access to a website that is associated with any of web servers 520*a-c* by first sending a DNS query to DNS server 510. A DNS query is generally a query to obtain an IP address that corresponds with a domain name provided in the query. DNS server 510, which may be part of an overall "black box" system which provides client 502 with access to one of the plurality of web servers 520*a-c* associated with a web address, is arranged to translate web addresses or domain names into the IP addresses which correspond to the web addresses. In one embodiment, the black box system may be implemented as a computing system which accepts information from client 502 in a format that includes code devices. When the black box system is a computing system, the black box system may include a processor, memory, and various computer readable media on which code devices, e.g., code devices associated with translating web addresses into IP addresses, are stored.

Once the DNS query is sent to the DNS server 510, DNS server 510 returns an IP address, i.e., the IP address associated with a website client 502 wishes to access, to client 502. In the described embodiment, the IP address returned is an IP address associated with web servers 520*a-c*. In general, client 502 may cache the IP address for a given amount of time, i.e., a time-to-live may be associated with the IP address. At such time as the time-to-live expires, when access to the website which was associated with the IP address is desired, client 502 typically sends a new DNS query to DNS server 510. While the IP address is cached, when access to the website associated with the IP address is desired, client 502 may use the cached IP address rather than request an IP address from DNS server 510.

Using the IP address returned by DNS server 510, client 502 may attempt to access one of web servers 520*a-c* through a gateway router 514, which may also be a part of the black box in which DNS server 510 is included. Gateway router 514 is effectively a node which enables client 502 to gain access to a network which includes or serves web servers 520*a-c*. As will be associated by those skilled in the art, gateway router 514 may run a border gateway protocol. In one embodiment, when client 502 is a personal computer at the home of a user, gateway router 514 may be associated with an Internet Service Provider (ISP) that connects client 502 to the Internet. Gateway router 514 is arranged to select a path for client 502 to use to access one of web servers 520*a-c*.

In an active-active system, i.e., when each web server 520*a-c* is active, a selection as to which web server 520*a-c* is to be used by client 502 to effectively access a website associated with a web address may be based upon the relative loads supported by each web server 520*a-c*. A load balancer 518, which may also be part of the black box, is arranged to allocate requests for access to a web address among web servers 520*a-c* in order to equalize the loads handled by each web server 520*a-c*. In cooperation with load balancer 518, gateway router 514 effectively selects which of web servers 520*a-c* client 502 accesses when client 502 attempts to access a web address. Often, a path between client 502 and a web server 520*a-c* which is least busy may be selected by gateway router 514. Alternatively, a path may be selected based on the shortest physical distance between client 502 and any of web servers 520*a-c*, or a path may be selected based on minimizing the number of nodes 522 and, hence, the number of hops, traversed by a path. It should be appreciated that in an active/standby system, i.e., in a system in which only one of web servers 520*a-c* is active at any given time, load balancer 518 may not be necessary, as there may only be one path through which access to a website associated with a web address may be obtained.

Figure 6:
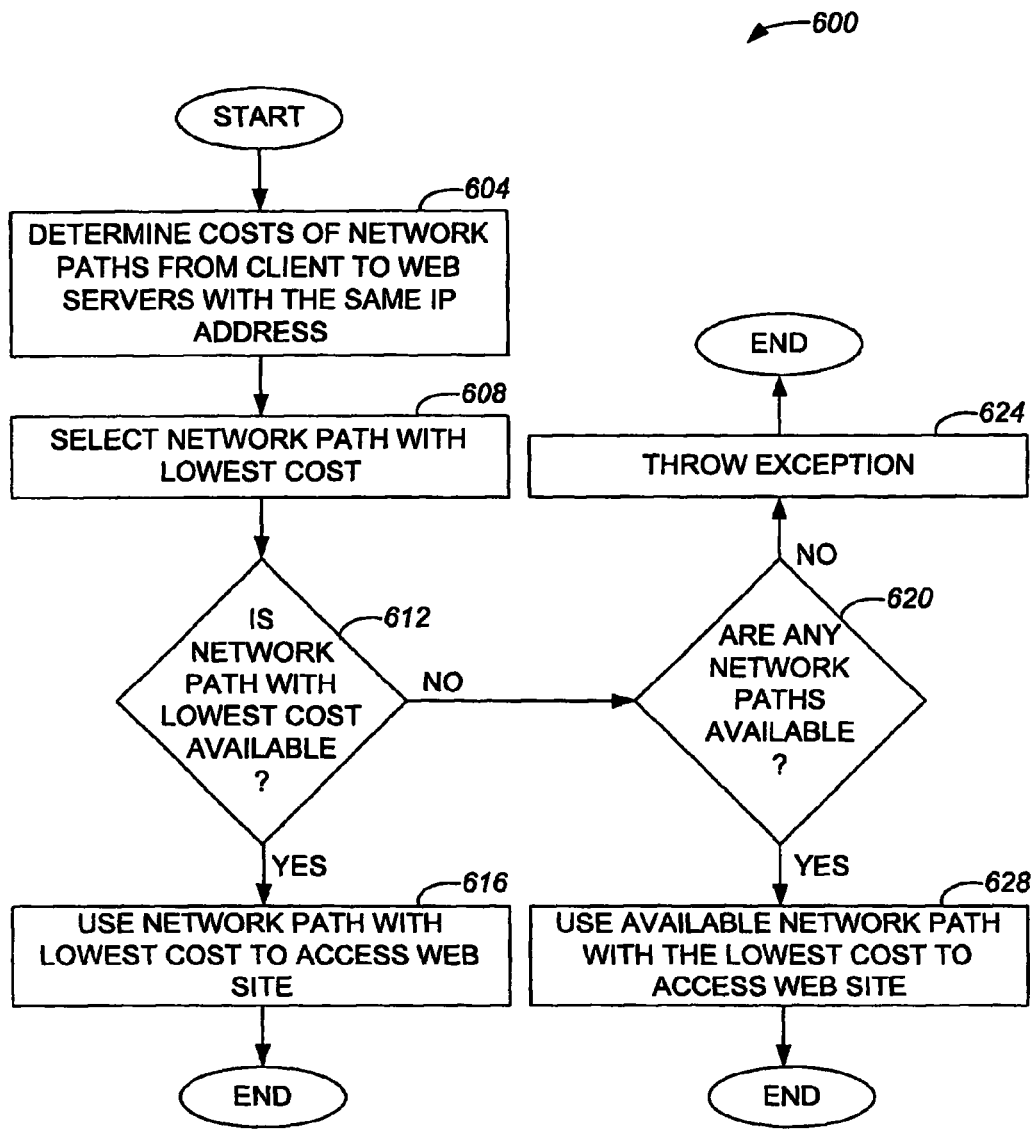
FIG. 6 is a process flow diagram which illustrates one active/standby method for accessing a website through a network path between a client a web server which shares an IP address with other web servers in accordance with an embodiment of the present invention.

In an active/standby system, substantially only one of a plurality of servers or devices which share an IP address is active at any given time. Hence, once a path to one of the servers is selected for use by the client to access a website, the client continues to use that path since that path would generally be the only path available for use in accessing the website. Referring next to FIG. 6, the steps associated with one active/standby method for accessing a website through a network path between a client a web server which shares an IP address with other web servers will be described in accordance with an embodiment of the present invention. A process 600 of accessing a website begins at step 604 in which costs of network paths between a client and web servers which share the same IP address. Calculating the costs may include, but is not limited to including, determining the number of hops associated with each path, the overall distance traversed by each path, and the bandwidth typically available on each path.

In step 608, the network path with the lowest cost is selected from among all network paths between the client and the web servers. A determination is then made in step 612 regarding whether the network path with the lowest cost is available. Determining whether the network path with the lowest cost is available may involve determining whether there is bandwidth available on the network path with the lowest cost, or whether the network path with the lowest cost is functional.

If the determination is that the network path with the lowest cost is available, then process flow moves from step 612 to step 616 in which the network path with the lowest cost is used to access the website. Once the network path with the lowest cost is used to access the website, the process of accessing a website is completed. Alternatively, if it is determined in step 612 that the network path with the lowest cost is not available, the indication is that another network path should be selected. When the network path with the lowest cost is not available, a determination is made in step 620 as to whether there are any network paths available between the client and a web server associated with the website available. If it is determined that there are no network paths available, the indication is that the client may not access the website through any path. As such, an exception is thrown in step 624, and the process of accessing a website is terminated.

If, however, the determination in step 620 is that there are network paths available, then the available network path with the lowest cost is selected for use in accessing the website. That is, the available network path with the lowest cost is used to access the website. Once the available network path with the lowest cost is selected, the process of accessing a website is completed.

Figure 7A:
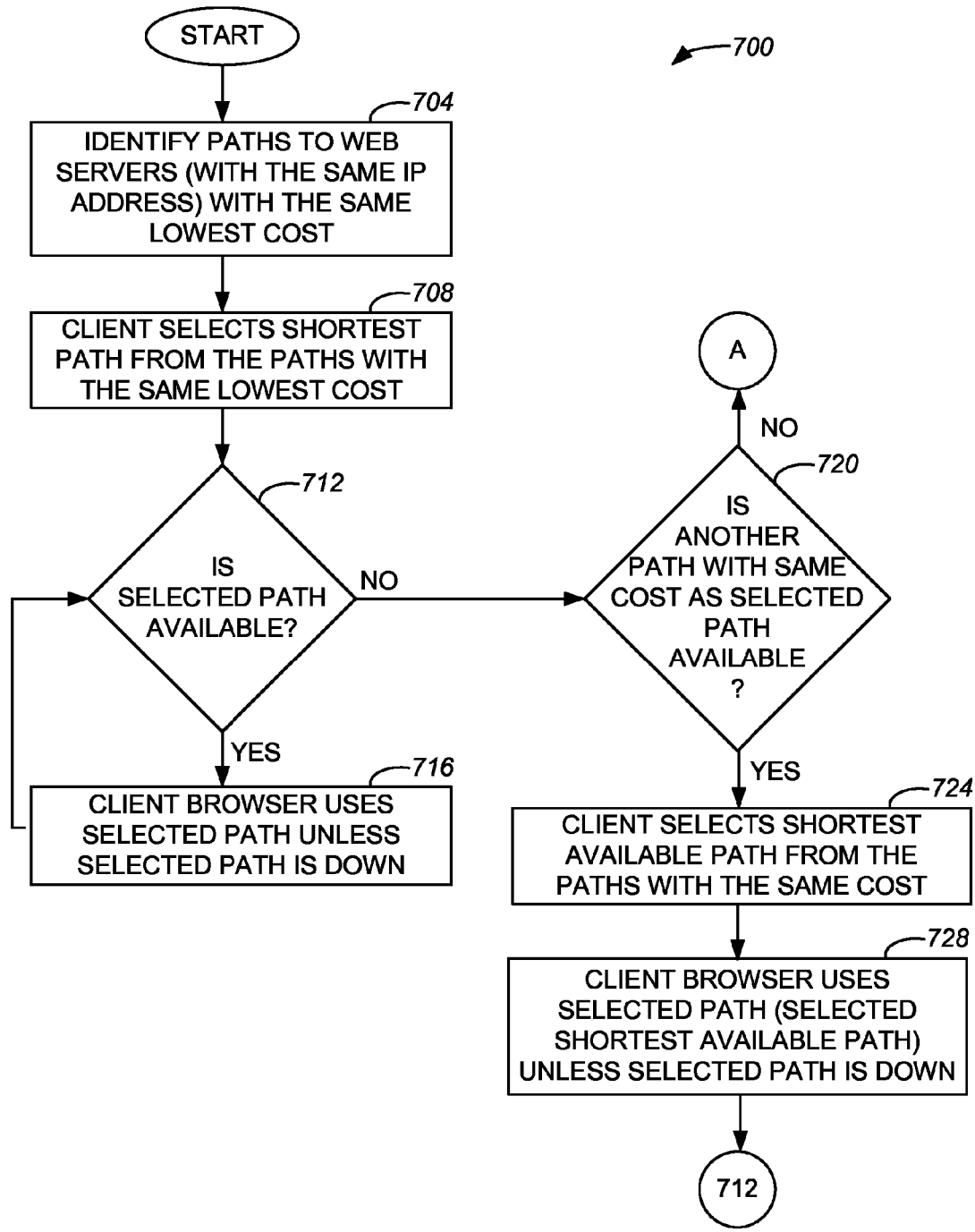
FIGS. 7A and 7B are a process flow diagram which illustrates one active/active method of accessing a website which is associated with a plurality of web servers that share an IP address.
Figure 7B:
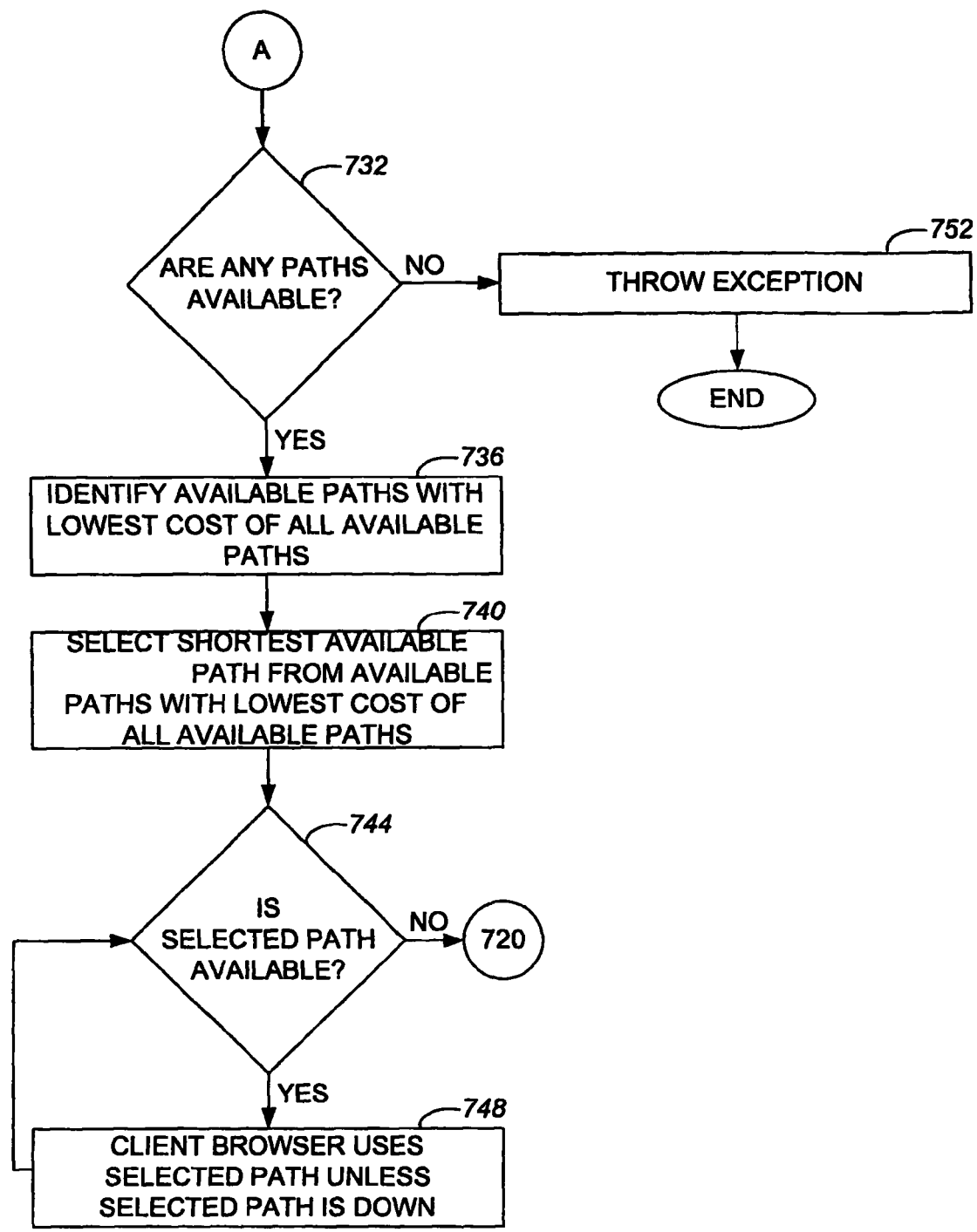

FIGS. 7A and 7B are a process flow diagram which illustrates one active/active method of accessing a website which is associated with a plurality of web servers that share an IP address. As previously mentioned, in an active/active system, the plurality of web servers that share an IP address are all active. A process 700 of accessing a website begins at step 704 in which paths, i.e., paths between a client and web servers with the same IP address, with the same lowest cost of all paths between the client and web servers are identified. Once the paths with the same lowest cost are identified, the client selects the shortest path from the paths with the same lowest cost in step 708. The shortest path of the paths with the same lowest cost may be the path from the client to a web server which is the physically closest web server to the client.

It should be appreciated that when the length of a path is a criterion for calculating the cost of a path, the paths with the same lowest cost may both be the shortest path. When two paths have the same path length, the selected path may be selected using another criterion, e.g., the path may be selected based on links or nodes which are preferred.

After the shortest path is selected in step 708, process flow proceeds to step 712 in which it is determined if the selected path is available. The selected path may be determined as being available when there is bandwidth available on the selected path for accommodating data, and when all links and nodes associated with the selected path are functional, e.g., on-line and "up" or in service. If it is determined that the selected path is available, then in step 716, a browser of the client uses the selected path to access the website unless the selected path is "down." A path which is in use may eventually go down due to a node failure or a link failure. As such, during the course of using the selected path, process flow returns to step 712 in which it is determined if the selected path is available.

If the determination in step 712 is that the selected path is not available, then in step 720, it is determined whether there is another path available which has the same cost as the selected path. If it is determined that there is an available path with the same cost as the selected path, the client selects that path in step 724 from among a set of paths with the same cost. In one embodiment, there may only be one path included in the set of paths with the same cost, i.e., the path selected in step 724 may be the only available path with the lowest available cost. Once the shortest available path is selected, a browser associated with the client uses the selected shortest available path to access the website, unless the selected path is down. The selected path is effectively monitored to determine if it remains available. Hence, process flow essentially returns from step 728 to step 712 in which it is determined if the selected path remains available.

Returning to step 720, if it is determined that another path with the same cost as the selected path is not available, the indication is that the client will have to utilize a path with a higher cost to access the website. As such, it is determined in step 732 whether there are any paths available between the client and any of the web servers which have the same IP address. If it is determined that there are no available paths, then an exception is thrown in step 752, and the process of accessing a website is terminated. Alternatively, if it is determined in step 732 that there is at least one available path, then any available path, or available paths, with the lowest cost of all available paths is identified in step 736. Once the available path is identified, or the available paths are identified, the shortest available path is selected in step 740. That is, the shortest available path of all available paths with the lowest cost is selected.

A determination is made in step 744 as to whether the selected path is available. If it is determined that the selected path is not available, then the indication is that the selected path has gone down or off line since its selection. Accordingly, process flow returns to step 720 in which it is determined whether another path with the same cost as the selected path is available. On the other hand, if it is determined that the selected path is available, then the browser associated with the client uses the selected path as long as the selected path is up or on line. As previously mentioned, a selected path is generally monitored to determine when it may go down or off line. As such, process flow moves from step 748 back to step 744 in which it is determined whether the selected path is available.

Although only a few embodiments of the present invention have been described, it should be understood that the present invention may be embodied in many other specific forms without departing from the spirit or the scope of the present invention. By way of example, the use of the same IP address to identify more than one server has been described in terms of web servers. However, the use of the same IP address to identify more than one server is not limited for use to web servers. Aspects of the present invention may generally apply to any suitable Internet-based systems and services. That is, in lieu of a website, the assignment of the same IP address relative to more than one server for use in accessing a resource may relate to substantially any suitable resource.

A black box or system which is used to allow a client to access more than one server that has the same IP address has generally been described as including a DNS server, a gateway router, and a load balancer. Such a system is not limited to including a DNS server, a gateway router, and a load balancer. Other components, including but not limited to a firewall, may also be included in such a system.

Additionally, while FIG. 5 shows a system which includes a DNS server, a gateway router, and a load balancer as being within a path between a client and a web server that hosts a website of interest, such a system may not necessarily be included in a path between a client and a web server that hosts a website of interest. That is, in one embodiment, the system may be remote and effectively not a part of the network between the client and the web servers.

A network within which autonomous systems support containers that have the same IP address has generally been described as being a TCP/IP network that enables TCP sessions. The same IP address may generally be used in any system that includes autonomous systems which support shared IP addresses. In other words, the assignment of the same IP address to different web servers is not limited to being used within TCP/IP networks.

In general, the steps associated with methods of the present invention may vary widely. Steps may be added, removed, altered, and reordered without departing from the spirit or the scope of the present invention. For example, when selecting a network path between a client and web servers associated with a website, i.e., when a path for the client to use to access a website is to be selected, all unavailable paths may first be eliminated from consideration. That is, in lieu of identifying the path with the lowest cost and then determining whether the path is available, available paths may first be identified, and the lowest cost path of the available paths may then subsequently be identified. Therefore, the present examples are to be considered as illustrative and not restrictive, and the invention is not to be limited to the details given herein, but may be modified within the scope of the appended claims.

What is claimed is:

1. A method for providing a plurality of paths that allow a client to access a website in a network that uses Internet Protocol (IP) addresses, the method comprising:

obtaining an IP address from a Domain Name Server (DNS) server by sending a DNS query thereto, wherein the IP address and the website are associated with a domain name, the domain name being identified in the query;

wherein a first web server is arranged to support the website at said IP address, and wherein a first path in the plurality of paths that allow the client to access the website is between the client and the first web server;

wherein the first web server is associated with a first autonomous system comprising a first list of IP addresses including said IP address;

wherein a second web server is arranged to support the website at said IP address, and wherein a second path in the plurality of paths that allow the client to access the website is between the client and the second web server;

wherein the second web server is associated with a second autonomous system comprising a second list of IP addresses including said IP address;

wherein the website is accessible through a router executing a gateway protocol, via at least one of the first path or the second path to said IP address, on at least one of the first web server or the second web server, and said gateway protocol is used to route packets between the first autonomous system and the second autonomous system;

subsequent to said obtaining, determining whether the first path to the IP address is available to the client to access the website on the first web server, at least by checking whether links and nodes in the first path are functional;

initiating a session from the client to the first web server to access the website in the first autonomous system by using the first path to the IP address when the first path is at least available;

monitoring whether the first path remains available during said session, by at least repeating said determining; and when the first path is found during said monitoring to be unavailable, using the second path to access the website in the second autonomous system.

2. The method of claim 1 wherein the website associated with the first web server and the website associated with the second web server are associated with a same domain name.

3. The method of claim 1 further comprising determining at least a first cost associated with the first path and a second cost associated with the second path, and determining when the first cost is lower than the second cost.

4. The method of claim 1 further comprising determining at least a first distance associated with the first path and a second distance associated with the second path, and determining when the first path is shorter than the second path.

5. The method of claim 1 further comprising:
calculating a first cost value for the first path between the client and the first web server associated with the IP address;
calculating a second cost value for the second path between the client and the second web server associated with the IP address, wherein the first web server is separate from the second web server;
when the first cost value is less than the second cost value, selecting the first path as a lowest cost path and the second path as an alternative path;
when the second cost value is less than the first cost value, selecting the second path as the lowest cost path and the first path as the alternative path;
determining whether the lowest cost path has available bandwidth to connect to the client; and
when the lowest cost path is operational and does not have available bandwidth, not permitting the client to access the website via the lowest cost path.

6. The method of claim 5 further comprising:
when not permitting the client to access the website via the lowest cost path, allowing the client to access the website via the alternative path.

7. The method of claim 5 where the first cost value is less than the second cost value when the first path has a fewer number of hops than for the second path.

8. The method of claim 5 where the first cost value is less than the second cost value when the first path has greater minimum bandwidth available than for the second path.

9. The method of claim 1 further comprising:
calculating a first cost value for the first path between the client and the first web server associated with the IP address;
calculating a second cost value for the second path between the client and the second web server associated with the IP address, wherein the first web server is separate from the second web server;
when the first cost value is less than the second cost value, selecting the first path as a lowest cost path and the second path as an alternative path;
when the second cost value is less than the first cost value, selecting the second path as the lowest cost path and the first path as the alternative path; and
when the lowest cost path is operational and does not have available bandwidth, allowing the client to select a third path, different from the first and second paths, to access the website, wherein the third path has a third cost value which is the same as the lowest cost path.

10. The method of claim 1 further comprising:
calculating a first cost value for the first path between the client and the first web server associated with the IP address;
calculating a second cost value for the second path between the client and the second web server associated with the IP address, wherein the first web server is separate from the second web server;
when the first cost value is equal to second cost value, determining if the first path satisfies a first criterion;
when the first cost value is equal to second cost value and the first path satisfies the first criterion, selecting the first path as the lowest cost path and the second path as an alternative path; and
when the lowest cost path is available, permitting the client to access the website via the lowest cost path.

11. The method of claim 10 further comprising:
when the lowest cost path is unavailable, allowing the client to select a third path, different from the first and second paths, to access the website, wherein the third path has a third cost value which is the same as the alternative path.

12. The method of claim 1 wherein the domain name is translated to the IP address by the DNS server.

13. The method of claim 1 wherein the second path is used to access the website in the second autonomous system without requiring that IP address change propagation occur.

14. A non-transitory computer-readable medium for providing a plurality of paths that allow a client to access a website in a network that uses Internet Protocol (IP) addresses, the non-transitory computer-readable medium comprising:
code devices to obtain a shared IP address;
wherein a first web server is associated with the shared IP address, the first web server being arranged to support the website at the shared IP address, wherein the first web server is associated with a first autonomous system comprising a first list of IP addresses including said shared IP address;
wherein a second web server is associated with the shared IP address, the second web server being arranged to support the website at the shared IP address,
wherein the second web server is associated with a second autonomous system comprising a second list of IP addresses including said shared IP address, the second autonomous system being different from the first autonomous system and wherein a router executing a gateway protocol is used to route packets between the first autonomous system and the second autonomous system;

codes devices to determine whether the first web server is available to the client to access the website, at least by checking whether links and nodes between the client and the first web server are functional;

code devices to use the first web server to access the website through the shared IP address in the first autonomous system via the router; and code devices to monitor whether the links and nodes remain functional;

code devices to use the second web server to access the website in the second autonomous system, at least if the second web server is accessible when the first web server is inaccessible.

15. The non-transitory computer-readable medium of claim 14 wherein the website has an associated domain name and the code devices that cause the shared IP address to be obtained include code devices that cause the domain name to be associated to the shared IP address.

16. The non-transitory computer-readable medium of claim 14 further comprising:

code devices that cause the gateway protocol to enable the first web server in the first autonomous system and the second web server in the second autonomous system to share the shared IP address.

17. The non-transitory computer-readable medium of claim 14 further comprising:

code devices that cause a session, between the client and one of the first web server and the second web server, to be initiated;

code devices that cause a determination of whether to use a first path of the plurality of paths to allow the client to access the website at the shared IP address on the first web server, wherein the first path is between the client and the first web server.

18. The non-transitory computer-readable medium of claim 17 wherein the code devices that cause a determination of whether to use the first path include code devices that cause a determination of at least a first cost associated with the first path and a second cost associated with a second path of the plurality of paths, wherein the second path is between the client and the second web server.

19. The non-transitory computer-readable medium of claim 17 wherein the code devices that cause a determination of whether to use the first path include code devices that cause a determination of at least a first distance associated with the first path and a second distance associated with a second path, wherein the second path is between the client and the second web server.

20. A system for providing a plurality of paths that allow a client to access a website in a network that uses IP addresses, the system comprising:

means for obtaining an IP address;

wherein the IP address identifies a first web server arranged to support the website at the IP address in a first autonomous system, wherein a first path of the plurality of paths that allow the client to access the website is between the client and the first web server; and wherein the IP address identifies a second web server arranged to support the website at the IP address in a second autonomous system, wherein a second path of the plurality of paths that allow the client to access the website is between the client and the second web server, and wherein a router executing a gateway protocol is used to route packets between the first autonomous system and the second autonomous system;

means for determining at least whether the first web server is available to the client to access the website by checking whether links and nodes between the client and the first web server are functional and monitoring whether the links and nodes remain functional;

means, responsive to the means for determining, for accessing the website at said IP address on one of the first web server or the second web server in a respective one of the first autonomous system or the second autonomous system via the router.

21. The system of claim 20 comprising means for caching the IP address at the client for an amount of time.

22. The system of claim 20 wherein the means for accessing comprises:

means for initiating a session between the client and one of the first web server and the second web server to allow the client to access the website.

23. The system of claim 22 wherein the means for initiating the session include:

means for determining whether to use the first path to allow the client to access the website at the IP address on the first web server.

24. The system of claim 23 wherein the means for determining whether to use the first path to allow the client to access the website at the IP address on the first web server include means for determining at least a first parameter associated with the first path and a second parameter associated with the second path, and means for determining when the first parameter is less than the second parameter.

25. The system of claim 23 further comprising:

means for using a cached IP address to access the website associated with the IP address.

26. An apparatus for providing a client with access to a resource, the resource being associated with a domain name, the apparatus comprising:

a server arrangement, the server arrangement being arranged to receive a request from the client to provide a shared IP address associated with the resource, wherein, using a computer processor, the server arrangement is arranged to translate the domain name associated with the resource into the shared IP address; and a router arrangement, the router arrangement being arranged to provide the client with access to one of a plurality of web servers associated with the shared IP address in a corresponding one of a plurality of autonomous systems, wherein the router arrangement executes a gateway protocol used to route packets between a first autonomous system and a second autonomous system;

wherein each one of the plurality of web servers associated with the shared IP address is arranged to host the resource, and in the plurality of web servers availability of a first web server for the client to access the resource is determined at least by checking whether links and nodes between the client and the first web server are functional, and monitoring whether the links and nodes remain functional;

the resource is accessible at the shared IP address in each of the autonomous systems through the router arrangement.

27. The apparatus of claim 26 wherein a first path of a plurality of paths is arranged between the client and the first web server of the plurality of web servers, and a second path of the plurality of paths is arranged between the client and a second web server of the plurality of web servers, and wherein the router arrangement is arranged to select one of the first path and the second path for use in providing the client with access to the resource.

28. The apparatus of claim 27 wherein the router arrangement includes a router and a load balancer, the load balancer being arranged to cooperate with the router to select the first path for use in providing the client with access to the resource when the first path is approximately the least loaded of the plurality of paths.

29. The apparatus of claim 27 wherein the router arrangement is arranged to select the first path for use in providing the client with access to the resource when the first path is the only available path of the plurality of paths.

30. The apparatus of claim 27 wherein the router arrangement is arranged to select the first path for use in providing the client with access to the resource when the first path has the lowest cost of the plurality of paths.

31. The apparatus of claim 27 wherein the router arrangement is arranged to select the first path for use in providing the client with access to the resource when the first web server is physically closer to the client than the second web server.

32. A method for providing a client with access to a resource, the resource being associated with a domain name, the method comprising:

receiving a request to access an IP address associated with the domain name, wherein the IP address, associated with the domain name, is further associated with a plurality of web servers arranged to host the resource at the IP address in a corresponding plurality of autonomous systems and wherein a router executing a gateway protocol is used to route packets between the plurality of autonomous systems;

identifying a first server of the plurality of web servers for use in establishing a session for the client to access the resource at the IP address in a first autonomous system different from a second autonomous system comprising a second server by determining whether the first server is available to the client to access the resource, at least by checking whether links and nodes between the client and the first server are functional; and monitoring whether the links and nodes remain functional after establishment of the session between the client and of the first server to access the resource at said IP address in the first autonomous system.

33. The method of claim 32 wherein identifying the first server for use in said establishing of the session includes at least one of identifying when a first path between the client and the first server has a lower cost than a second path between the client and the second server, identifying when the first path is active and the second path is inactive, identifying when the client is physically closer to the first server than to the second server, and identifying when the first server has a lighter load than the second server.

* * * * *

UNITED STATES PATENT AND TRADEMARK OFFICE
CERTIFICATE OF CORRECTION

PATENT NO.         : 8,166,197 B2                                          Page 1 of 1
APPLICATION NO.    : 11/257954
DATED              : April 24, 2012
INVENTOR(S)        : Hoynowski et al.

It is certified that error appears in the above-identified patent and that said Letters Patent is hereby corrected as shown below:

On sheet 5 of 7, in figure 6, Reference Numeral 628, line 3, delete "WEB SITE" and insert -- WEBSITE --, therefor.

In column 4, line 55, delete "client" and insert -- client and --, therefor.

In column 8, line 12, delete "client" and insert -- client and --, therefor.

In column 14, line 22, in Claim 23, delete "path-to" and insert -- path to --, therefor.

In column 16, line 15, in Claim 32, delete "of the first" and insert -- the first --, therefor.

Signed and Sealed this
Thirty-first Day of July, 2012

David J. Kappos
*Director of the United States Patent and Trademark Office*